United States Patent [19]
Beladakis

[11] Patent Number: 5,526,606
[45] Date of Patent: Jun. 18, 1996

[54] LANDSCAPING DIVIDER CAP

[76] Inventor: Trifon Beladakis, 937 N. Grace, Park Ridge, Ill. 60068

[21] Appl. No.: 391,121

[22] Filed: Feb. 21, 1995

[51] Int. Cl.[6] ........................................................ A01G 1/08
[52] U.S. Cl. .................................... 47/33; 52/102; 404/7
[58] Field of Search ....................... 47/33; 404/7; 52/102

[56] References Cited

U.S. PATENT DOCUMENTS

| | | |
|---|---|---|
| 3,378,949 | 4/1968 | Dorris . |
| 3,387,786 | 6/1968 | Rynberk ........................................ 47/33 |
| 3,484,989 | 12/1969 | Lazinsky . |
| 3,788,001 | 1/1974 | Balfanz . |
| 4,281,473 | 8/1981 | Emalfarb et al. . |
| 4,647,491 | 3/1987 | Ireland ........................................ 47/33 |
| 4,659,247 | 4/1987 | Steiner . |
| 4,823,521 | 4/1989 | Kontz . |
| 4,831,776 | 5/1989 | Fritch ........................................ 47/33 |
| 4,858,379 | 8/1989 | West . |
| 4,910,910 | 3/1990 | Jones ........................................ 47/33 |
| 4,984,689 | 1/1991 | Emalfarb et al. . |
| 5,067,273 | 11/1991 | Richwine . |

*Primary Examiner*—Henry E. Raduazo
*Attorney, Agent, or Firm*—Willian Brinks Hofer Gilson & Lione

[57] ABSTRACT

A landscaping cap for use as a protective or ornamental covering for landscaping dividers. In one embodiment an elongated extruded plastic cap has an internal shape adapted to substantially conform to an exterior shape of an upper section of a landscaping divider, said cap having a longitudinal slit along its bottom to allow the cap to fit over and enclose the upper section of the landscaping divider.

20 Claims, 2 Drawing Sheets

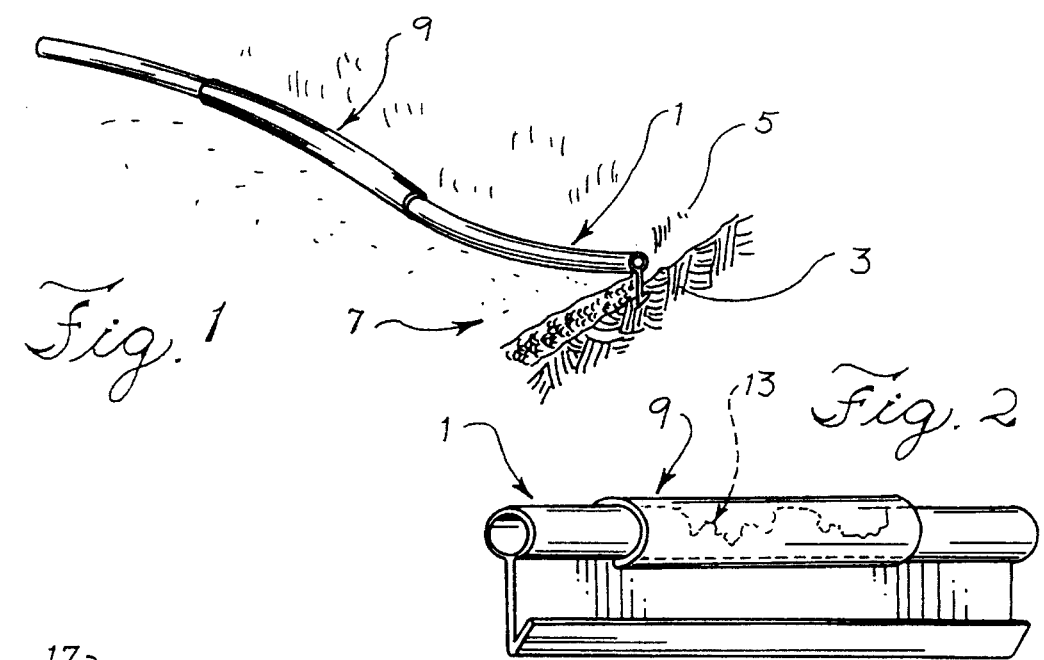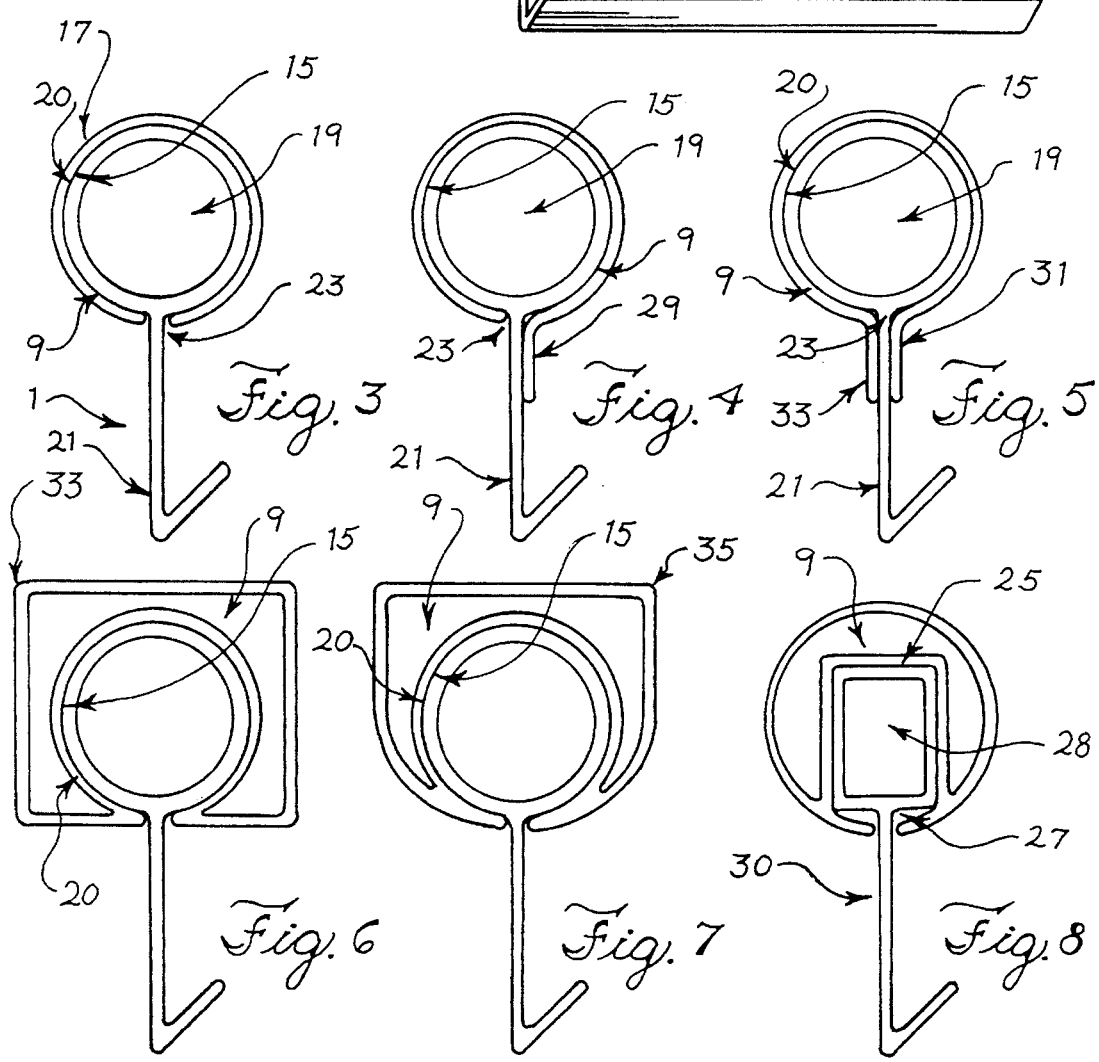

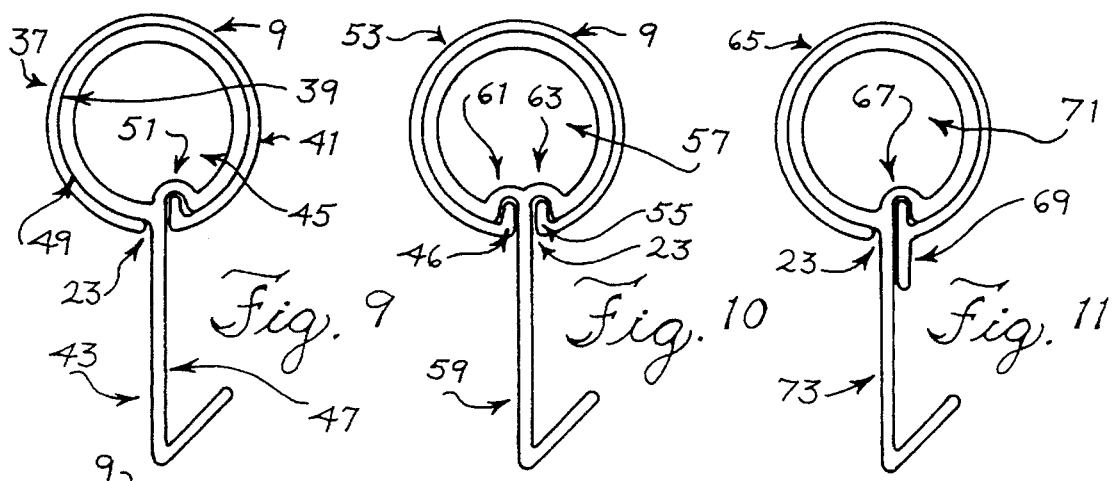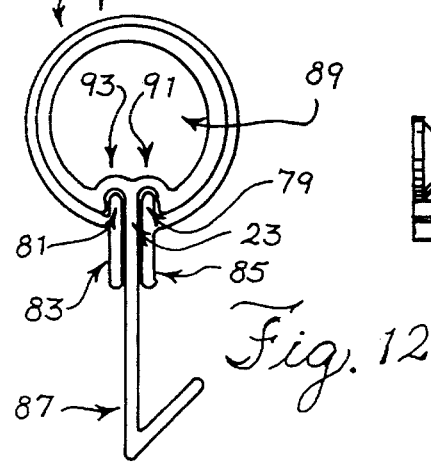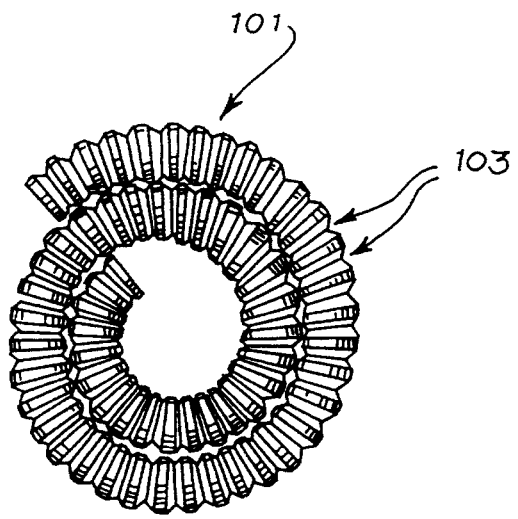

LANDSCAPING DIVIDER CAP

FIELD OF THE INVENTION

This invention relates to landscaping dividers. In particular this invention relates to elongated caps which are used to protect landscaping dividers, used to repair damaged landscaping dividers, and used to aesthetically enhance landscaping dividers.

BACKGROUND OF THE INVENTION

Landscaping dividers such as the one disclosed in U.S. Pat. No. 4,281,473, are commonly Used to form a boundary between various areas of a lawn, garden, or landscaping area. For example, a landscaping divider may be used to separate the edge of a lawn from the garden area. In such a manner, the divider may function to prevent the rooting of grass into the adjacent garden area. The divider also serves as an aesthetic boundary divider to enhance lawn, garden, or landscaping areas.

Typically, landscaping dividers are inserted into the ground and often include means, such as upwardly canted lips on the lower section, to securely maintain the landscaping divider in place. In this manner, the upper section of the divider is exposed, while the remainder of the divider is firmly embedded in the ground. The exposed upper section is prone to damage from lawn mowers and garden tools. The exposed upper section is also prone to weakening from exposure to the sun and may become easily damaged if stepped on or run over with a lawn mower. A damaged landscaping divider is often unsightly and requires replacement of the entire divider to effect a repair. Removal of a damaged landscaping divider can be a time-consuming and difficult task sometimes requiring the user to dig up the surrounding areas in order to remove the firmly embedded divider. Furthermore, landscaping dividers are commonly sold and installed in lengths of twenty feet long or longer. Consequently, even if only a portion of the divider has been damaged, replacement of the entire section may be necessary to effect a proper repair.

Additionally, landscaping dividers are often made from extruded plastic material. Due to cost constraints, landscaping dividers are normally supplied only in the color black. It has been found that black colored extruded plastic dividers are less susceptible to degradation and damage from exposure to sunlight. In order to provide colored dividers that will better withstand degradation and damage from sunlight, expensive plastic material containing ultraviolet stabilizers must be used. Consequently, low-priced landscaping dividers are typically only available in black.

OBJECTS OF THE INVENTION

It is an object of the present invention to provide an elongated cap for use as a protective device for the exposed upper section of a landscaping divider. It is a further object of the invention to provide an elongated cap to repair a damaged landscaping divider without having to unearth or replace the landscaping divider. It is a further object of the invention to provide a landscaping divider cap in a variety of colors and external shapes to visually enhance the landscaping area. It is a further object of the invention to provide a landscaping divider assembly comprising a landscaping divider and landscaping divider cap configured to provide an integral unit.

SUMMARY OF THE INVENTION

In the present invention an elongated divider cap is provided as a protective covering for a landscaping divider. The divider cap has an internal shape configured to substantially conform to the exterior shape of a landscaping divider. The divider cap is adapted to fit over and enclose the exposed upper section of a landscaping divider. The divider cap is comprised of a flexible resilient material which allows for easy installation of the divider cap onto the landscaping divider and also allows for easy removal. In this manner the divider cap can be used as a protective covering for landscaping dividers which are already embedded or can be used in conjunction with a landscaping divider at the time of the initial installation.

The divider cap is useful to protect landscaping dividers from damage from lawnmowers and garden tools, or degradation from exposure to the sun. If the divider cap itself becomes damaged, it can be easily removed and replaced with another divider cap. This eliminates the need to unearth and replace the landscaping divider itself, resulting in savings in time, effort, and cost.

Additionally, the divider cap can be used as a repair or replacement device. If an existing landscaping divider suffers unsightly damage from a lawnmower or garden tool, or becomes brittle and cracks from exposure to the sun, the divider cap of the present invention can be used to repair the landscaping divider. The divider cap can be placed over the damaged portion of the landscaping divider to effect a repair. In this manner, the unsightly damaged portions of the landscaping divider are covered. The time, effort, and cost of replacement is eliminated and the useful life of the landscaping divider is extended.

Divider caps of the present invention can be used separately or can be used as part of a landscaping divider assembly where the divider and divider cap are configured to provide an integral unit. The integral unit can be provided wherein the divider cap is removably attached to the landscaping divider or permanently attached to the landscaping divider. The permanently attached integral unit can be formed by coextruding the divider cap onto the landscaping divider.

In addition, the divider cap of the present invention can be provided with a variety of external shapes to visually enhance the landscaping area. For example, the external shape of the divider cap could be triangular, square, rectangular, hexagonal, octagonal, circular or any other geometric shape to provide a visually appealing divider. The external shape of the divider cap could also be a combination of geometric shapes, for example, circular on the bottom and square on the top.

Furthermore, the divider cap may be made from extruded plastic material containing UV stabilizers, which permit the divider cap to come in a variety of colors and protect the divider cap from deteriorating from exposure to sunlight. When using a colored divider cap with a landscaping divider, to protect against exposure to the sun, only the divider cap needs to contain the expensive UV stabilizers. As a result, inexpensive colored dividers are now available to consumers which will better withstand degradation from exposure to sunlight. Prior to the present invention, inexpensive sun-protected colored landscaping dividers were unavailable because it was necessary to use UV stabilizers in the entire divider.

The divider cap may also be formed with notches at regular intervals which are sufficient to allow the divider cap to be coiled for transport and packaging. In this manner, lengthy divider caps could be provided to complement landscaping dividers which are commonly sold in lengths of twenty feet or longer.

BRIEF DESCRIPTION OF THE DRAWINGS

FIG. 1 is a perspective view of a landscaping divider cap in place on an upper section of a landscaping divider.

FIG. 2 is a perspective view of a landscaping divider cap in place over a damaged landscaping divider.

FIG. 3 is a cross-sectional view of one embodiment of a landscaping divider cap in place over a landscaping divider.

FIGS. 4–7 are cross-sectional views of further embodiments of a landscaping divider cap in place over a landscaping divider.

FIG. 8 is a cross-sectional view of a further embodiment of a landscaping divider cap in place over a landscaping divider.

FIGS. 9–12 are cross-sectional views of further embodiments of a landscaping divider cap in combination with a landscaping divider.

FIG. 13 is a side view of a landscaping divider cap with notches formed in the external shape of the divider cap.

FIG. 14 is a top view of a coiled landscaping divider cap with notches formed in the external shape of the divider cap.

DETAILED DESCRIPTION OF THE PREFERRED EMBODIMENTS

As shown in FIG. 1, a landscaping divider 1 is shown embedded in the ground 3, separating adjacent landscape areas 5 and 7. A landscaping divider cap 9 is shown in place over the landscaping divider 1. In this manner, the landscaping divider cap 9, serves as a protective covering for the landscaping divider 1. The landscaping divider cap is comprised of a flexible resilient material which allows for easy installation of the divider cap onto the landscaping divider and also allows for easy removal. The divider cap of the present invention can be used as protective covering for landscaping dividers which are already imbedded or can be used in combination with a landscaping divider at the time of installation.

In the preferred embodiment, the landscaping divider cap is comprised of medium density polyethylene, but use of flexible PVC, polypropylene, other plastics, or any other relatively flexible material which could be used in the manner of this invention is possible. The divider cap is preferably formed using conventional plastic extruding techniques. However, molding or other manufacturing techniques are also possible.

As shown in FIG. 2, a section of divider cap 9 is shown in place over landscaping divide 1, effecting a repair of a damaged portion 13 of landscaping divider 1. Through use of the divider cap 9, the damaged portion 13 of the landscaping divider 1 is no longer visible. In this manner, a section of the divider cap can be used to repair only the damaged portion of a landscaping divider, or a divider cap which is equal to the entire length of the landscaping divider can be used.

To improve the protection provided by the divider cap 9, UV stabilizers may be added to the plastic material. UV stabilizers are commonly available in pellet or powder form. Plastic pellets containing UV stabilizers are available from companies such as DuPont. The addition of the UV stabilizers to the divider cap allows for greater protection from degradation from exposure to sunlight. In the absence of UV stabilizers, it has been found that black dividers are best at withstanding degradation from exposure to sunlight. When UV stabilizers are used, divider caps can be made in a variety colors, other than black.

In FIG. 3, landscaping divider cap 9 is shown with internal shape 15, external shape 17, and opening or slit 23. For ease of convenience the divider cap will be referenced as "9" and the slit will be denoted as "23" in the Figures, although the Figures represent different embodiments. Also shown is landscaping divider 1, which has un upper section 19 with exterior shape 20, and a lower flange section 21. In use, the slit 23 is spread open to allow divider cap 9 to fit over and enclose upper section 19. The divider cap 9 is made from flexible resilient material to allow the divider cap 9 to return to its prior state after it is placed over the upper section 19. To enable a proper fit, the internal shape 15 of the divider cap 9 iS configured to substantially conform to the exterior shape 20 of landscaping divider 1. In this manner the divider cap 9 fits over and encloses the upper section 19.

FIG. 4 depicts a divider cap 9 which includes a tang 29 downwardly extending from slit 23. In this manner the divider cap is attached to upper section 19 of landscaping divider 21.

FIG. 5 depicts a divider cap 9 which includes two tangs 31 and 33 downwardly extending from slit 23. In this manner the divider cap is attached to upper section 19 of landscaping divider 21.

The divider cap of the present invention can be adapted for use with many different types of landscaping dividers. For example, in FIGS. 3–7, the landscaping divider is depicted with a circular and hollow upper section 19 and a lower flange section 21. Landscaping dividers of this type are commercially available. However, the divider cap of the present invention is not limited in use to dividers of this type, and can be used with many different types of landscaping dividers that have some type of exposed upper section, whether it is hollow, solid, or a combination of both. Furthermore, the lower embedded portion of the landscaping divider can be of essentially any design.

As shown in FIGS. 3–7, the internal shape 15 of divider cap 9 is circular and substantially conforms to the exterior shape 20 of the upper section 19 of landscaping divider 1. However, the internal shape of the divider cap could be a variety of shapes. For example, as shown in FIG. 8, a divider cap is shown with a rectangular internal shape 25 substantially conforming to the rectangular exterior shape 27 of the upper section 28 of landscaping divider 30.

In FIG. 6, a divider cap 9 is shown with a square external shape 33. In the present invention the external shape of the divider cap can be a variety of shapes including circular, triangular, square, rectangular, hexagonal, octagonal, or a combination of shapes, or any other contour.

In FIG. 7, a divider cap 9 is shown with an external shape 35 which is a combination of shapes—square on top, circular on the bottom.

FIG. 9 depicts a landscaping divider and divider cap assembly 37 wherein divider cap 9 includes an internal shape 39, an external shape 41, and an opening or slit 23. Landscaping divider 43 includes an upper section 45 and lower section 47. The internal shape 39 of divider cap 9 substantially conforms to the exterior shape 49 of upper section 45. Divider cap 9 further includes a tang 49 upwardly extending from slit 23. Upper section 45 of landscaping divider 43 includes slot 51 for reception of tang 49 to allow divider cap 9 to latch onto landscaping divider 43. In this manner the divider cap can be removably secured to the landscaping divider.

FIG. 10 depicts a landscaping divider and divider cap assembly 53 wherein divider cap 9 includes tangs 55 and 56 upwardly extending from slit 23. Upper section 57 of landscaping divider 59 includes slots 61 and 63 for reception of tangs 55 and 56 to allow divider cap 9 to latch onto landscaping divider 59.

FIG. 11 depicts a landscaping divider and divider cap assembly 65 wherein divider cap 9 includes tang 67 upwardly extending from slit 23 and tang 69 downwardly extending from slit 23. Upper section 71 of landscaping divider 73 includes slot 75 for reception of tang 67 to allow divider cap 9 to latch onto landscaping divider 73.

FIG. 12 depicts a landscaping divider and divider cap assembly 77 wherein divider cap 9 includes tangs 79 and 81 upwardly extending from slit 23 and tangs 83 and 85 downwardly extending from slit 23. Upper section 89 of landscaping divider 87 includes slots 91 and 93 for reception of tangs 79 and 81 to allow divider cap 9 to latch onto landscaping divider 87.

The landscaping divider cap can be removably latched or secured to the landscaping divider or can be permanently attached. The present invention contemplates coextruding the divider cap onto the landscaping divider at the same time using conventional plastic extruding techniques.

FIGS. 13 and 14 depict a landscaping divider cap 101 with notches 103 in the external surface of the divider cap which allow the divider cap to be coiled for transport and packaging.

Whereas the invention has been shown and described in connection with the preferred embodiments thereof, it will be understood that many modifications, substitutions and additions may be made which are within the intended broad scope of the appended claims.

I claim:

1. A cap for use as a covering for a standard sized landscape divider having a lower generally vertical section and an upper section with an expanded exterior shape having thickness dimension substantially greater than the thickness of said lower section, said cap comprising:

an elongated strip made of flexible, resilient material, said cap having a cross-section including an internal shape and an external shape, said internal shape having a generally circular cross-section adapted to substantially conform to and enclose said expanded exterior shape of said landscaping divider, and said cap having a slit extending longitudinally the length of the cap to allow said cap to fit over and enclose said expanded upper section of said landscaping divider for substantially the length of said landscaping divider.

2. The elongated cap of claim 1 wherein the internal shape of said cap is substantially circular and said cap is made of extruded plastic material.

3. The elongated cap of claim 2 wherein the extruded plastic material contains ultraviolet stabilizers to allow said plastic material to be formed in different colors and to protect said cap from deteriorating from exposure to sunlight.

4. The elongated cap of claim 2 wherein at least a portion of the cross-section of the external shape of said cap is selected from the group consisting of triangular, square, rectangular, hexagonal, octagonal and circular.

5. The elongated cap of claim 1 further including at least one tang downwardly extending from said slit for at least a portion of the length of the cap.

6. The elongated cap of claim 5 wherein the internal shape of said cap is substantially circular and said cap is made of extruded plastic material.

7. The elongated cap of claim 6 wherein the extruded plastic material contains ultraviolet stabilizers to allow said plastic material to be formed in different colors and to protect said cap from deteriorating from exposure to sunlight.

8. The elongated cap of claim 1 wherein notches are formed in said external shape at regular intervals sufficient to allow said cap to be coiled for transport and packaging.

9. In combination, a landscaping divider and a landscaping divider cap, comprising:

a landscaping divider comprising a lower flange section and an expanded upper section, said expanded upper section having a cross-section including an exterior shape; and an elongated cap made of flexible, resilient material, said cap having a cross-section including an internal shape and an external shape, said internal shape having a generally circular cross-section adapted to substantially conform to and enclose the exterior shape of the expanded upper section of said landscaping divider; said cap having a slit extending longitudinally the length of the cap; whereby the cap will fit over and enclose said upper section of said landscaping divider for substantially the length of said landscaping divider.

10. The combination of claim 9, wherein the internal shape of said elongated cap is substantially circular and said cap is made of extruded plastic.

11. The combination of claim 10, wherein the extruded plastic material contains ultraviolet stabilizers to allow said plastic material to be formed in different colors and to protect said cap from deteriorating from exposure to sunlight.

12. The combination of claim 9, wherein the elongated cap further includes at least one tang downwardly extending from said slit for at least a portion of the length of the cap.

13. The combination of claim 9, wherein the elongated cap further includes at least one tang upwardly extending from said slit into the interior of said cap for at least a portion of the length of the cap; and said upper section of the landscaping divider has at least one slot extending the length of said landscaping divider for the reception of said tang to allow said cap to latch onto said landscaping divider.

14. The combination of claim 13, wherein the internal shape of said elongated cap is substantially circular and said cap is made of extruded plastic.

15. The combination of claim 14, wherein the extruded plastic material contains ultraviolet stabilizers to allow said plastic material to be formed in different colors and to protect said cap from deteriorating from exposure to sunlight.

16. In a landscaping divider comprising a lower flange section and an expanded upper section having an external shape, the improvement comprising:

a removable elongated cap made of flexible, resilient material, said cap having a cross-section including an internal shape and an external shape, said internal shape having a generally circular cross-section adapted to substantially conform to and enclose said exterior shape of said expanded upper section of said landscaping divider, and said cap having a slit extending longitudinally the length of the cap to allow said cap to fit over and enclose said expanded upper section of said landscaping divider for substantially the length of said landscaping divider.

17. The improvement of claim 16 wherein the internal shape of said cap is substantially circular and said cap is made of extruded plastic material.

18. The improvement of claim 17 wherein the extruded plastic material contains ultraviolet stabilizers to allow said plastic material to be formed in different colors and to protect said cap from deteriorating from exposure to sunlight.

19. In an extruded plastic landscaping divider comprising a lower flange section and an upper section having an external shape, the improvement comprising:

an elongated protective cap made of flexible extruded plastic material, said cap having a cross-section including a internal shape and an external shape, said internal shape configured to substantially conform to an exterior shape of an upper section of said landscaping divider, and wherein said cap is coextruded onto substantially the length of said upper section of said landscaping divider to form an integral unit.

20. The improvement of claim 19 wherein the extruded plastic material of said cap contains ultraviolet stabilizers to allow said cap to be formed in different colors and to protect said cap from deteriorating from exposure to sunlight.

* * * * *